(Model.)

J. BOYLE.
GROMMET.

No. 395,477. Patented Jan. 1, 1889.

WITNESSES: INVENTOR.

UNITED STATES PATENT OFFICE.

UNITED STATES PATENT OFFICE.

JOHN BOYLE, OF BROOKLYN, NEW YORK.

GROMMET.

SPECIFICATION forming part of Letters Patent No. 395,477, dated January 1, 1889.

Application filed August 17, 1888. Serial No. 283,001. (Model.)

*To all whom it may concern:*

Be it known that I, JOHN BOYLE, of Brooklyn, in the county of Kings and State of New York, have invented certain new and useful Improvements in Grommets, of which the following is a specification.

The grommets heretofore in use were composed of a flanged thimble and a washer, through the aperture of which the thimble is passed, so that when the tubular shank of the thimble is clinched over the washer the flaring edge of the shank holds the washer in position in the fabric. The overlapping of the flaring edge of the thimble laps over the washer for a short distance, according to the size of the grommet. When, by accident or by constant use, the flaring edge of the thimble releases the washer, the entire grommet falls to pieces, so that the edge of the fabric to which the grommet was applied ravels or frays out and presents an unsightly appearance.

The object of this invention is to furnish an improved grommet by which the washer is retained rigidly by the thimble and clinched in a very strong and reliable manner; and the invention consists of a grommet composed of a flanged thimble, an intermediate eyelet having teeth or prongs at both edges, said prongs alternating with each other, and a washer provided with a tubular shank, which shank extends between the eyelet and the shank of the thimble, so that when clinching the parts the eyelet and washer are firmly and reliably retained on the fabric by the flaring edge of the shank of the thimble.

The invention consists, secondly, of a grommet in which the outer circumferences of the flanged thimble and of the washer are provided with outwardly-bent and rolled-over rims, by which the cutting of the fabric by the edges of the thimble and washer is effectually prevented.

Figure 3:
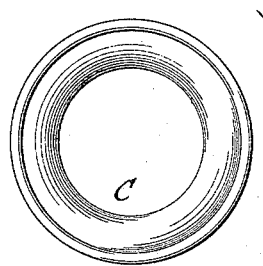
Figure 2:
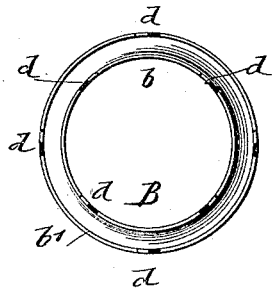
Figure 1:
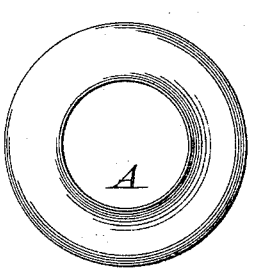
Figure 1:
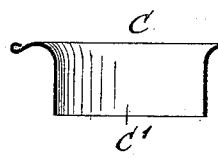
Figure 1:
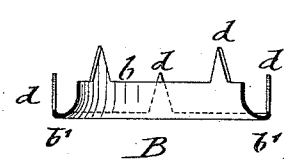
Figure 1:
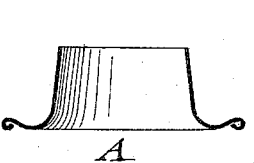

In the accompanying drawings, Figure 1 represents, respectively, a top view and a vertical central section of the flanged thimble of my improved grommet. Fig. 2 shows, respectively, a top view and a vertical central section of the intermediate eyelet of the grommet; Fig. 3, a top view and a vertical central section of the washer of the grommet; and Figs. 4 and 5 are vertical central sections of the grommet, showing it respectively before and after the same is clinched onto the fabric.

Similar letters of reference indicate corresponding parts.

In the drawings, A represents a flanged thimble, B the intermediate eyelet, and C a washer having a tubular shank, C', which form together my improved grommet. Both the thimble A and washer C are provided at their outer circumferential edges with outwardly-bent and rolled-over rims $a$ $a'$. These rims prevent the cutting of the fabric, which formed an objectionable feature in the grommets heretofore in use, as the sharp edges of the thimble and washer were in contact with the fabric and exerted an objectionable cutting action on the same. The rolled-over or beaded rims of the edges of the thimble and washer of the grommet prevent any cutting on the surface of the fabric and impart additional strength to the grommet.

Figure 4:
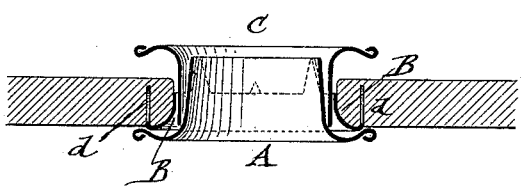
Figure 5:
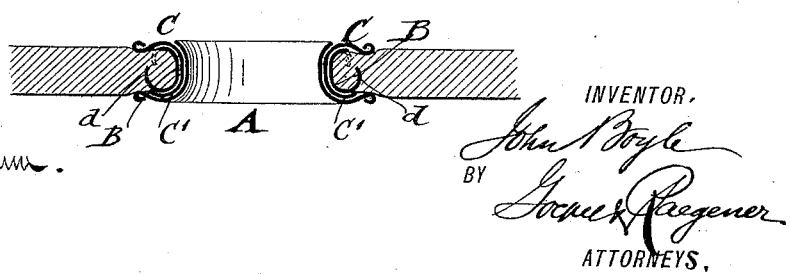

The tubular shank of the thimble A is made slightly conical, the shank of the washer being interposed between the shank of the thimble and the eyelet when placing the parts in position for being clinched on the fabric, as shown in Fig. 4. The eyelet B is formed of a tubular shank, $b$, having a flange, $b'$, the edge of the shank $b$ and the edge of the flange $b'$ being provided with prongs $d$ $d$, which alternate with each other, the prongs of the flange being bent at right angles to the flange, as shown clearly in Fig. 2. When the eyelet is clinched, the prongs of both edges are forced at alternating points through the fabric, so as to rigidly secure the eyelet to the same.

The grommet is applied to the fabric by first placing the shank of the thimble through the hole in the fabric; secondly, placing the eyelet over the shank of the thimble; thirdly, placing the shank of the washer over the shank of the thimble and between it and the eyelet, as shown in Fig. 4, and then clinching the parts together, so that they tightly bind on the fabric, as shown in Fig. 5. The clinching of the parts is accomplished by suitable dies in the usual manner, the result being that the eyelet is securely applied to the fabric with the teeth or prongs of the same piercing the fabric from opposite sides, and that the shanks of both the thimble and washer are bent around the eyelet, so as to rigidly bind on the same. The shanks of the thimble and washer overlap each other and secure the parts in connection with the flaring edge of the shank of the thimble firmly and reliably in position on the fabric. By the clinched, flaring, and overlapping shanks of the thimble and washer the eyelet as well as the flange of the thimble and the washer are firmly secured to the fabric, so that in connection with the piercing of the fabric by the prongs of the eyelet the separating or dislodging of any part of the grommet is effectively prevented. The fabric is thereby prevented from stretching or spreading at the opening and getting detached from the grommet, whereby the raveling or fraying out of the fabric is prevented.

I do not claim, broadly, a grommet composed of a flanged thimble, an intermediate flanged eyelet provided with prongs or teeth at both edges, said prongs alternating with each other, and a washer extending over the eyelet and secured by the clinched shank of the thimble, as my invention consists in the above-named elements with the addition of a tubular shank to the washer, by which the grommet is more effectually secured to the material; and it consists, further, of the outwardly-bent and rolled-over rim of the outer circumferences of said thimble and washer.

Having thus described my invention, I claim as new and desire to secure by Letters Patent—

1. A grommet composed of a flanged thimble, an intermediate flanged eyelet provided with teeth or prongs at both edges, said prongs alternating with each other, and a washer provided with a tubular shank interposed between the shank of the thimble and the eyelet, the shanks of the thimble and washer being securely clinched over the eyelet, substantially as set forth.

2. A grommet the flanged thimble and washer of which are provided at their outer circumferences with outwardly-bent and rolled-over rims, substantially as set forth.

In testimony that I claim the foregoing as my invention I have signed my name in presence of two subscribing witnesses.

JOHN BOYLE.

Witnesses:
PAUL GOEPEL,
MARTIN PETRY.